(12) United States Patent
Nakade et al.

(10) Patent No.: US 9,105,105 B2
(45) Date of Patent: Aug. 11, 2015

(54) IMAGING DEVICE, IMAGING SYSTEM, AND IMAGING METHOD UTILIZING WHITE BALANCE CORRECTION

(71) Applicant: Hitachi, Ltd., Chiyoda-ku, Tokyo (JP)

(72) Inventors: Mayumi Nakade, Tokyo (JP); Shinichiro Hirooka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/140,498

(22) Filed: Dec. 25, 2013

(65) Prior Publication Data

US 2014/0192223 A1     Jul. 10, 2014

(30) Foreign Application Priority Data

Jan. 8, 2013   (JP) ................ 2013-001057

(51) Int. Cl.
*H04N 9/73*   (2006.01)
*G06T 5/40*   (2006.01)
*G06T 5/00*   (2006.01)
*H04N 9/68*   (2006.01)

(52) U.S. Cl.
CPC .. *G06T 5/40* (2013.01); *G06T 5/009* (2013.01)

(58) Field of Classification Search
USPC ............... 348/223.1, 224.1; 358/516, 522; 382/168
See application file for complete search history.

(56) References Cited

U.S. PATENT DOCUMENTS

| | | | | |
|---|---|---|---|---|
| 7,460,168 | B2* | 12/2008 | Horiuchi | 348/362 |
| 7,583,297 | B2* | 9/2009 | Yamada | 348/224.1 |
| 8,199,372 | B2* | 6/2012 | Suekane | 358/474 |
| 8,358,355 | B2* | 1/2013 | Deguchi et al. | 348/223.1 |
| 2007/0085911 | A1* | 4/2007 | Nakamura | 348/223.1 |
| 2010/0259639 | A1* | 10/2010 | Hung et al. | 348/223.1 |
| 2010/0321520 | A1* | 12/2010 | Zhou | 348/222.1 |
| 2011/0229019 | A1* | 9/2011 | Batur et al. | 382/159 |
| 2011/0261261 | A1 | 10/2011 | Mori et al. | |
| 2011/0267543 | A1* | 11/2011 | Miyazawa | 348/672 |
| 2012/0155763 | A1* | 6/2012 | Zhang et al. | 382/167 |
| 2013/0093917 | A1* | 4/2013 | Zhang et al. | 348/223.1 |
| 2013/0177206 | A1* | 7/2013 | Hata | 382/103 |

FOREIGN PATENT DOCUMENTS

JP     2010-147969 A     7/2010

* cited by examiner

*Primary Examiner* — Ngoc-Yen Vu
(74) *Attorney, Agent, or Firm* — Miles & Stockbridge P.C.

(57) ABSTRACT

An imaging device includes a histogram unit that extracts luminance information from video signals obtained by image capture and generates a histogram, a white balance detector unit that detects the deviation in the white balance of the video signal, and a white balance processor unit that corrects the white balance of the video signal; and along with selecting the imaging conditions of the imaging unit based on the deviations detected by the white balance detector unit, also controls the white balance processor unit. When there is a large deviation in the white balance, the imaging device decides whether or not to correct the white balance according for example to the hue.

9 Claims, 18 Drawing Sheets

(1) GOOD VISIBILITY (2) BAD VISIBILITY (NIGHTTIME)

(3) BAD VISIBILITY (DAYTIME)

FIG.9

| ANALYSIS RESULTS | | | CONTROL CONDITIONS | |
|---|---|---|---|---|
| LUMINANCE | CONTRAST | WHITE BALANCE | IR FILTER | WHITE BALANCE PROCESSING |
| HIGH | HIGH | – | INSERTED | LIMIT IN EFFECT |
| HIGH | LOW | OUTSIDE LIMIT CANCELLATION DOMAIN | INSERTED | LIMIT IN EFFECT |
| HIGH | LOW | WITHIN LIMIT CANCELLATION DOMAIN | INSERTED | NO LIMIT |
| LOW | LOW | – | NOT INSERTED | NO CORRECTION |

| ANALYSIS RESULTS | | | CONTROL CONDITIONS | |
|---|---|---|---|---|
| LUMINANCE | CONTRAST | WHITE BALANCE | IR LIGHT SOURCE | WHITE BALANCE PROCESSING |
| HIGH | HIGH | — | OFF | LIMIT IN EFFECT |
| HIGH | LOW | OUTSIDE LIMIT CANCELLATION DOMAIN | ON | LIMIT IN EFFECT |
| HIGH | LOW | WITHIN LIMIT CANCELLATION DOMAIN | OFF | NO LIMIT |
| LOW | LOW | — | ON | NO CORRECTION |

(1) R SIGNAL LUMINANCE DISTRIBUTION (2) G SIGNAL LUMINANCE DISTRIBUTION (3) B SIGNAL LUMINANCE DISTRIBUTION

IMAGING DEVICE, IMAGING SYSTEM, AND IMAGING METHOD UTILIZING WHITE BALANCE CORRECTION

CROSS-REFERENCE TO RELATED APPLICATION

This application claims the priority of Japanese Patent Application No. 2013-001057 filed Jan. 8, 2013, which is incorporated herein by reference in its entirety.

BACKGROUND

The present invention relates to an imaging device, imaging system, and imaging method.

A background technology for the technical field is disclosed in Japanese Unexamined Patent Application Publication No. 2010-147969. The Japanese Unexamined Patent Application Publication No. 2010-147969 discloses a technology including, "an image correction unit that performs the specified image correction processing on the input image to generate the output image, a calculation unit to acquire a luminance histogram for each field of the input image and calculate any or all of the binary through ternary values among any of the average luminance value, standard deviation value, and intermediate value, and a correction control unit to decide whether or not image correction processing of the input image is needed and correction quantity based on the binary values or ternary values among the average luminance value, standard deviation value, and intermediate value of the luminance histogram calculated in the calculation unit, and to control the image correction unit."

SUMMARY

A main application of imaging devices is surveillance cameras and vehicle on-board cameras. There is also a strong need in this field to capture sharp images of the target object under conditions of poor visibility such low illuminance and fog. Methods to resolve this problem include not only light in the visible range but also utilization of light in the near-infrared range.

The technology disclosed in Japanese Unexamined Patent Application Publication No. 2010-147969 gives no consideration whatsoever to circumstances that change the white balance simultaneously with yellow dust and other objects as factors that worsen visibility conditions and so cannot provide adequate correction. Moreover, the technology can be expected to acquire high visibility images through control of pertinent imaging conditions but sometimes renders the opposite effect for yellow dust and fog.

Whereupon the present invention proposes an imaging device, imaging system, and imaging method for outputting high visibility images even under poor environment imaging conditions.

To address the aforementioned problems, the present invention employs the structure disclosed in the range of the claims.

The present invention renders the effect of providing an imaging device, imaging system, and imaging method that outputs high visibility images even under bad environmental conditions.

BRIEF DESCRIPTION OF THE DRAWINGS

FIG. 9 is a drawing showing one example of the relation between the analysis results and the control conditions for histogram unit and the white balance detector unit;

DETAILED DESCRIPTION

The embodiments of the present invention are described next while referring to the accompanying drawings.

First Embodiment

Figure 1:
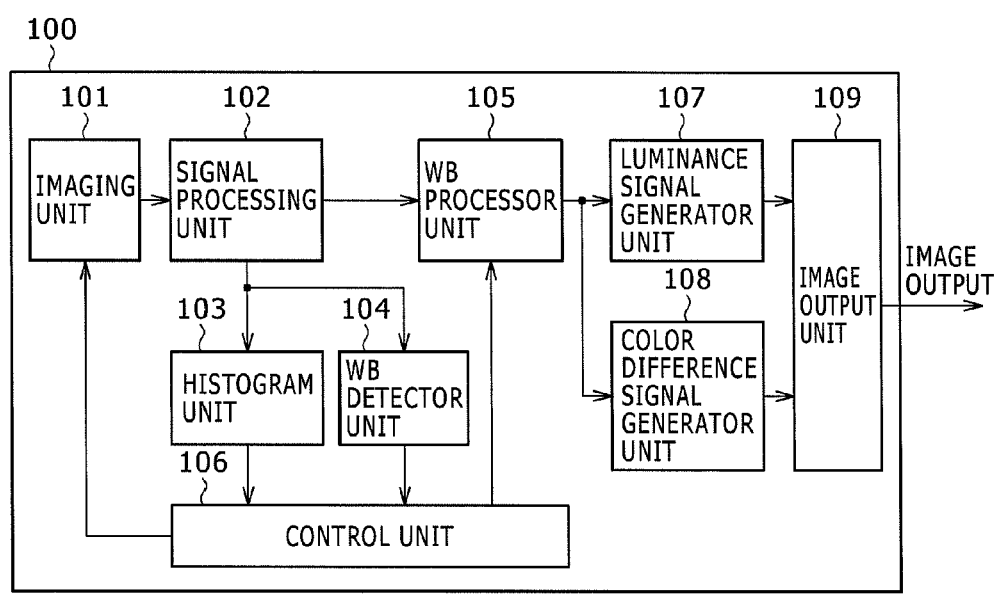
FIG. 1 is a block diagram showing the overall structure of the imaging device of one embodiment.

FIG. 1 is a block diagram showing the overall structure of the imaging device of the first embodiment. The reference numeral 100 denotes the imaging device; 101 denotes the imaging unit, 102 denotes the signal processing unit; 103 denotes the histogram unit; 104 denotes the white balance (WB) detector unit, 105 denotes the white balance (WB) processor unit, 106 denotes the control unit, 107 denotes the luminance signal generator unit, 108 denotes the color difference signal generator unit, and 109 denotes the image output unit.

The imaging unit 101 includes an infrared (IR) filter to cut infrared light, a lens group containing a zoom lens and focus lens, an iris, a shutter, an image sensor comprised of imaging elements such as a CCD or CMOS, and an AD converter, etc. The optical image received by the image sensor is photoelectrically converted and a signal is output. The signal processing unit 102 performs separation and demosaicing on the signals output from the imaging unit 101, and for example generates and outputs the luminance signal and red, blue, and green color signal, etc. The white balance processor unit 105 corrects the white balance to amplify the color signal of each color signal output by the signal processing unit 102 based on the correction quantity set in each color signal and outputs each amplified color signal. The luminance signal generator unit 107 applies to the color signal output from the white balance processor unit 105 a synthesizing process using for example a conversion formula for converting from a color signal to a luminance signal, and outputs the luminance signal. The color difference signal generator unit 108 applies to the signal output from the white balance processor unit 105 for example, a synthesizing process using for example a conversion formula for converting from each color signal to a color difference signal, and outputs the color difference signal. The image output unit 109 outputs the luminance signal output from the luminance signal generator unit 107 and the color difference signal output from the color difference signal generator unit 108 to outside of the imaging device 100 or generates a video signal synthesized from these signals and outputs the synthesized signal to outside imaging device 100.

The histogram unit 103 for example generates a luminance data histogram contained in luminance signals from the luminance signal output from the signal processing unit 102, and outputs luminance information such as the dispersion and average of the luminance data distribution. The white balance detector unit 104 analyzes the color signal output from the signal processing unit 102 and outputs information relating to the deviation in the white balance and color difference information, etc. The control unit 106 finds the status of the brightness and contrast from the luminance information output by the histogram unit 103, decides whether or not the imaging environment is a satisfactory visual field and selects the imaging conditions of the imaging unit 101. The control unit 106 decides the imaging environment from the color difference information and information relating to the deviation in the white balance output by the white balance detector unit 104, and determines and sets the correction quantity of the white balance processor unit 105 according to the imaging environment.

The control for determining imaging conditions for the imaging unit 101 is for example control to attach or detach an IR filter in the imaging unit 101. When decided that the environment is a dark night-time state, the control unit 106 can detach the IR filter to utilize the IR light intensity, which will lower the color reproducibility but allows high luminance and contrast and can improve visibility. Also, when there is a large deviation in the white balance, the control unit decides the object for image capture is not appropriate for white balance correction and does not perform white balance correction. However, in imaging devices used for surveillance and so on, the color of the imaging object must be accurately reproduced regardless of the imaging environment, and in designated imaging environments where the color of the imaging object changes such as imaging environments for example where yellow dust (dust from Yellow River region in China) is falling, the white balance correction should preferably be corrected even in cases where the deviation in white balance is large. Under environmental conditions where yellow dust is falling, the contrast of the object diminishes due to the diffused reflection of light because of the yellow dust, and the addition of the color yellow from the yellow dust causes the white balance to greatly deviate in the yellow direction. The control unit 106 decides there is yellow dust from the contrast and the deviation in the white balance, and sets the white balance processor unit 105 to a correction quantity required by the deviation in the white balance, and the white balance is then corrected.

As described above, in the imaging device 100 of the present invention, the control unit 106 decides the imaging environment from the output of the histogram unit 103 and the white balance detector unit 104, and by controlling the white balance processor unit 105 and switching of the imaging conditions in the imaging unit 101 can provide an imaging device that generates images with higher visibility.

An example of the structural components in the imaging unit 101 is described in detail next while referring to the drawings.

Figure 2:
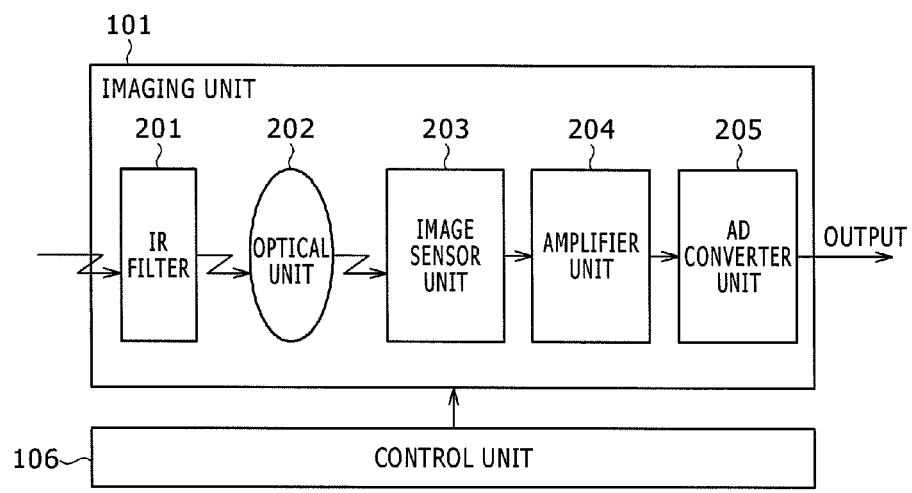
FIG. 2 is a block diagram showing an example of the structure of the imaging unit.

FIG. 2 is a block diagram showing an example of the structure of the imaging unit 101. Structural elements identical to those in FIG. 1 are assigned the same reference numerals. The imaging unit 101 is for example configured from an IR filter 201 that cuts the infrared ray (IR) component of the incident light, the optical unit 202, the image sensor unit 203, the amplifier unit 204 that amplifies the signal level, and the AD converter unit 205 that converts the analog signals to digital signals. The control unit 106 can select insertion or non-insertion of IR filter 201. If insertion of the IR filter 201 is selected then the light whose infrared light was cut from the incident light is input to the image sensor unit 203 by way of the optical unit 202. If non-insertion of the IR filter 201 was selected then the incident light including the infrared light is input to the image sensor unit 203 by way of the optical unit 202.

The image sensor unit 203 performs photoelectric conversion and outputs a signal corresponding to the light intensity of the light received by the image sensor unit 203. The image sensor unit 203 also acquires color information by the placement of pixels on the same image sensor having sensitivity to wavelengths corresponding for example to each of the colors red, blue, and green.

Figure 3:
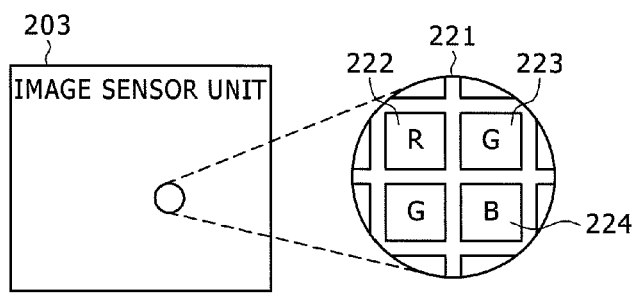
FIG. 3 is a drawing showing one example of the pixel placement in the image sensor unit.

FIG. 3 is a drawing showing one example of the pixel placement in the image sensor unit 203. Structural elements identical to those in FIG. 2 are assigned the same reference numerals. Here, the reference numeral 221 denotes a section 221 of the image sensor unit 203 shown enlarged in the drawing and contains repeatedly placed R pixels 222 having main sensitivity for the light wavelength for the color red, the G pixel 223 having main sensitivity on the light wavelength for the color green, and the B pixel 224 having main sensitivity on the light wavelength for the color blue. The G pixel 223 in the image sensor unit 203 has a large effect on the resolution of the entire image so in the pixel placement example, the G pixel 223 are placed at double the amount of the R pixels 222 and B pixels 224. However, the pixel placement and configuration may be different according to the imaging device application and are not limited to the placement in FIG. 3. An image sensor unit may also utilize complementary color pixels instead of the R pixels 222, G pixel(s) 223, and B pixel(s) 224.

Figure 4A:
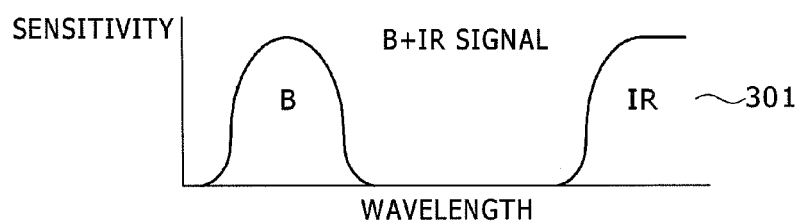
FIG. 4A is a drawing showing the spectral characteristics of the pixel.
Figure 4B:
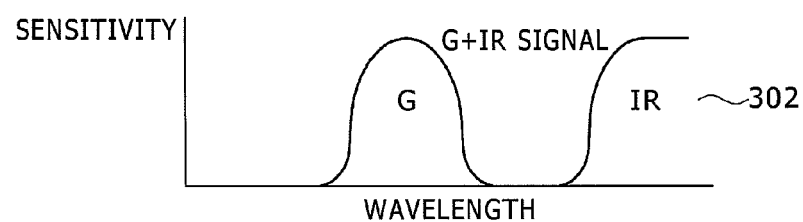
FIG. 4B is a drawing showing the spectral characteristics of the pixel.
Figure 4C:
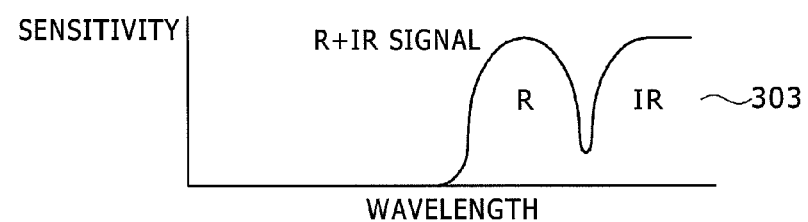
FIG. 4C is a drawing showing the spectral characteristics of the pixel.

FIGS. 4A, 4B, and 4C are drawings showing the sensitivity characteristics for the wavelength of the light of the R pixels 222, G pixels 223, and B pixels 224 shown in FIG. 2, or in other words, drawings showing the spectral characteristics of the pixel. In FIG. 4A through 4C, 301 is the spectral characteristic of B pixel 224, 302 is the spectral characteristic of G pixel 223, and 303 is the spectral characteristic of the R pixel 222. Also, R indicates the wavelength region of the red visible light, G indicates the wavelength region of the green visible light, B indicates the wavelength region of the blue visible light, and IR indicates the wavelength region of the infrared light. The spectral characteristic 301 shows the R and IR sensitivity, the spectral characteristic 302 shows the G and IR sensitivity, and the spectral characteristic 303 shows the B and IR sensitivity. Under a normal imaging environment, the IR sensitivity which worsens the color reproducibility is not needed. Inserting the IR filter 201 in FIG. 2 cuts the IR component and acquires just the light intensity of the visible light. Under environmental imaging with low illumination such as at night, the light intensity is low and the image has low visibility. Therefore, when the IR filter of FIG. 2 is removed, the light intensity incident on the image sensor unit 203 increases and the sensitivity of the IR portion can be utilized, and the sensitivity of the imaging unit 101 can be enhanced.

When the image sensor unit 203 utilizes the pixel placement in FIG. 3, examples of the output signal from the imaging unit 101 and the processing by the signal processing unit 102 are described as follows.

Figure 5:
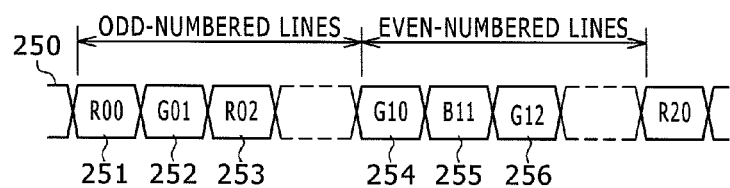
FIG. 5 is a drawing showing an example of the output signal from the imaging unit.

FIG. 5 is a drawing showing an example of the output signal from the imaging unit 101. The reference number 250 denotes the output signal, the reference numbers 251 and 253 denote luminance data for red, the reference numbers 252, 254, and 256 denote luminance data for green, and the reference number 255 denotes luminance data for blue. FIG. 5 shows the output signal when the R pixels 222 and G pixels 223 are alternately placed on the odd-numbered line; and the G pixels 223 and B pixels 224 are alternately placed on the even-numbered line as for example shown in FIG. 3. The odd-numbered line and even-numbered line and the pixel repeat sequence are not limited to this example and can be interchanged as needed by the output timing and the image sensor unit 203 pixels.

The signal processor unit 102 in FIG. 1 that inputs the signal output from the imaging unit 101 performs signal generation processing according to the resolution and frequency of the output image signal required by the imaging device 100.

Figure 6:
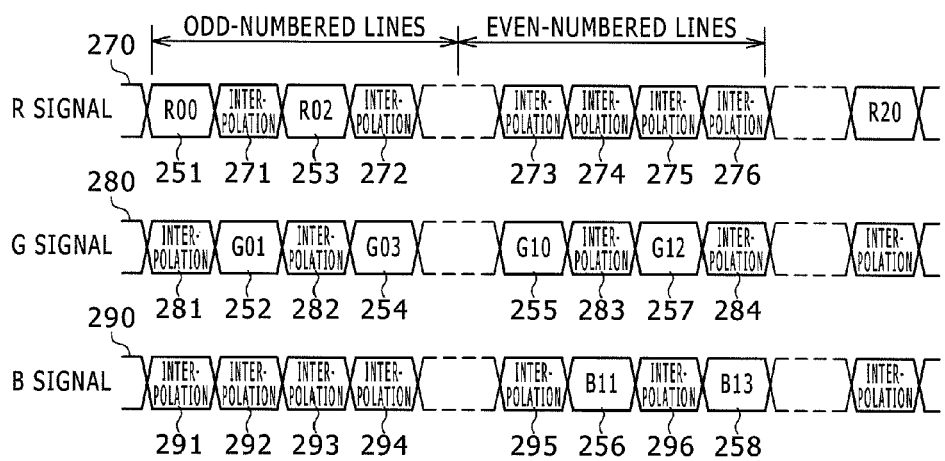
FIG. 6 is a drawing showing an example of the output signal from the signal processing unit

FIG. 6 is a drawing showing an example of the output signal from the signal processing unit 102 of FIG. 1. Signals identical to those in FIG. 5 are assigned the same reference numerals. The reference numeral 270 denotes the R signal, 280 denotes the G signal, and 290 denotes the B signal. The reference numerals 251 and 253 are the luminance data for red, 271 through 276 are the interpolation data for red, 252, 254, 255, and 257 are the luminance data for green, 281 through 284 are the interpolation data for green, 256 and 258 are the luminance data for blue, and 291 through 296 are the interpolation data for blue. In the signal processing unit 102, the red luminance data 251, 253, etc., the green luminance data 252, 254, etc., and the blue luminance data 256, etc., are for example isolated from the output signal 250 in FIG. 5; and the R signal 270, G signal 280 and B signal 290 are generated. When the resolution of the output image signal at this time must be greater than the number of each of the luminance data, demosaicing is performed to generate interpolation luminance data from the luminance data of the adjacent pixels.

In the signal processing unit 102, the average value of the red luminance data and the green luminance data may be output as the luminance signal for the histogram unit 103 which is not required for boosting the resolution. The average value of the green luminance data 252 and the red luminance data 251 from the odd-numbered lines of the output signal 250 in FIG. 5 may for example be output as the luminance signal. The processing load on the histogram unit 103 can in this way be alleviated by lowering the resolution.

Figure 7:
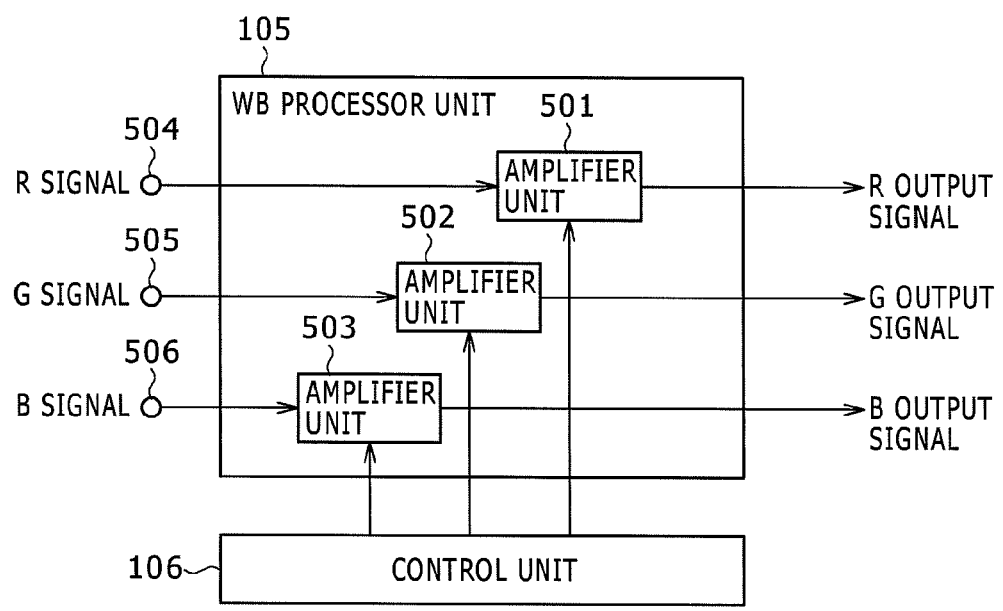
FIG. 7 is a block diagram showing an example of the structure of the white balance processor unit.

FIG. 7 is a block diagram showing an example of the structure of the white balance processor unit 105. Structural elements identical to those in FIG. 1 are assigned the same reference numerals. The reference numerals 504, 505, and 506 denote the signal input terminals. The R signal, G signal, and B signal serving as the output signal for the signal processing unit 102 are respectively input to these signal input terminals. The reference numerals 501, 502, and 503 denote the amplifier units, and the control unit 106 sets each of the amplification rates. The white balance processor unit 105 performs white balance processing by changing for example the amplification rates of the R signal 270, G signal 280, and B signal 290 as shown in FIG. 6.

The white balance may also be adjusted by clamping one (color) signal level and adjusting the other two signal levels. For example if clamping the G signal, there is no need to amplify the G signal so no amplifier unit 502 is required, and the circuit structure can therefore be simplified.

The histogram unit 103 detects the distribution of the luminance level of the video signal output from the signal processing unit 102 and for example outputs information for judging the overall luminance of the image, and information for judging the contrast. The information for judging the luminance for example is average luminance or intermediate values; and the information for judging the contrast is the maximum value, minimum value or the dispersion, etc.

Figure 8A:
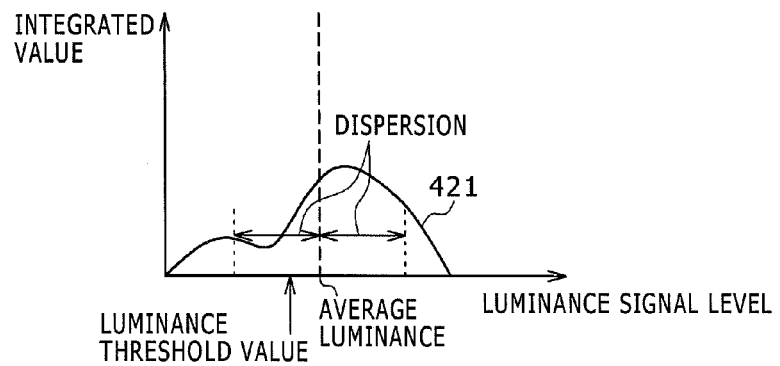
FIG. 8A is a graph showing an example of the luminance distribution detected by the histogram unit.
Figure 8B:
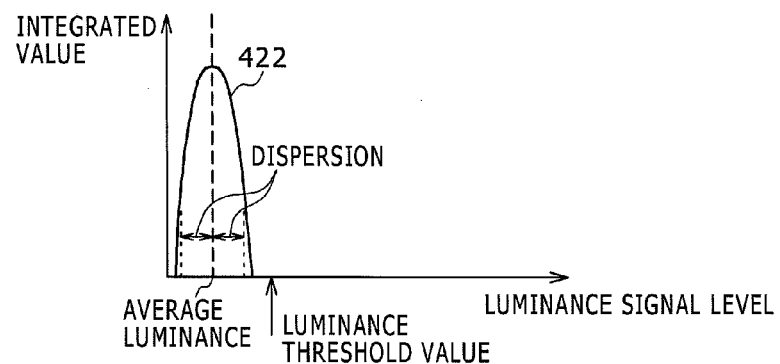
FIG. 8B is a graph showing an example of the luminance distribution detected by the histogram unit.
Figure 8C:
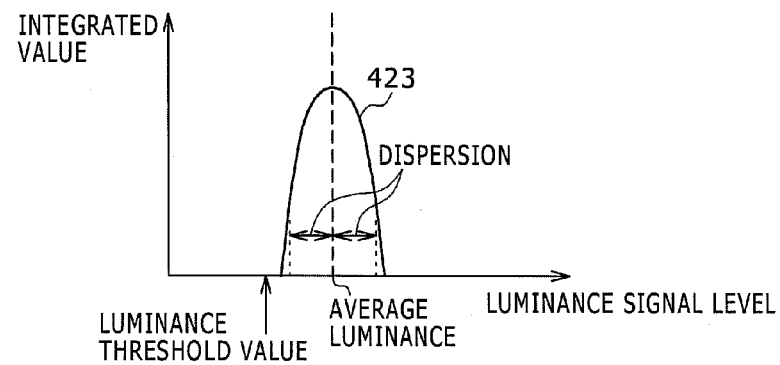
FIG. 8C is a graph showing an example of the luminance distribution detected by the histogram unit.

FIGS. 8A, 8B, and 8C are drawings showing an example of the luminance distribution detected by the histogram unit 103. Here, FIG. 8A is an example of a histogram when an image is captured in an environment with good visibility, FIG. 8B is an example of a histogram when an image is captured in a dark environment, and FIG. 8C is an example of a histogram when an image is captured in an environment that is bright but has bad visibility. In FIG. 8A, the average luminance is high and the luminance level is widely distributed so that the dispersion is large. In FIG. 8B, the average luminance is low and the luminance level dispersion is small. In FIG. 8C, the average luminance is high and the luminance level dispersion is small. The control unit 106 decides the visibility such as at night is bad when the average luminance for example has fallen below the preset luminance threshold value. In dispersion in the relative index for contrast for example, the control unit 106 decides that visibility is good when dispersion is larger than a preset dispersion width and decides the visibility is bad if smaller than that preset dispersion width due to a drop in contrast such as from yellow dust or fog, and executes control of each section.

The white balance detector unit 104 detects the amount of deviation and the deviation direction in the white balance of the video signal output from the signal processing unit 102. The deviation in white balance for example can express by the color difference obtained from the R signal luminance data, G signal luminance data, and B signal luminance data when expressing white. The color difference is at the origin point when the R signal luminance data, G signal luminance data, and B signal luminance data match each other, and the deviation in white balance at that time is 0. In the control unit 106, when the R signal luminance data, G signal luminance data, and B signal luminance data are different and the white balance has deviated, the amplification coefficient of the R signal and B signal is obtained from the ratio of the R signal and B signal luminance data relative to the G signal luminance data, and is set in the amplification units 501, 502, and 503 of the white balance processor unit 105 in FIG. 7.

Here, the control unit 106 will not correct a white balance deviation detected by the white balance detector unit 104 that has exceeded a particular limit value except when the color difference is within a predetermined limit cancellation domain. The limit cancellation domain is for example the region within the range of the color of yellow dust excluding the time that yellow dust is falling. When decided that yellow dust is present, the control unit 106 controls white balance correction regardless of the amount of deviation in the white balance.

FIG. 9 is a drawing showing one example of the relation between the control conditions and the analysis results for histogram unit 103 and the white balance detector unit 104 of the imaging device 100.

When the luminance and contrast are both high during good visibility, or when the luminance is high but the contrast is low and the white balance is outside the limit cancellation domain such as when there is fog, an IR filter is inserted the same as for imaging devices for image capture during normal visible light, and white balance processing is performed when there is a limit on the amount of white balance deviation.

When the luminance is high, contrast is low, and the white balance is within the limit cancellation domain such as when there is yellow dust, the white balance is adjusted regardless of the amount of white balance deviation.

No IR filter is inserted if the luminance is low, and the white balance processing is not performed.

The processing flow in the above imaging device 100 is described next.

Figure 10:
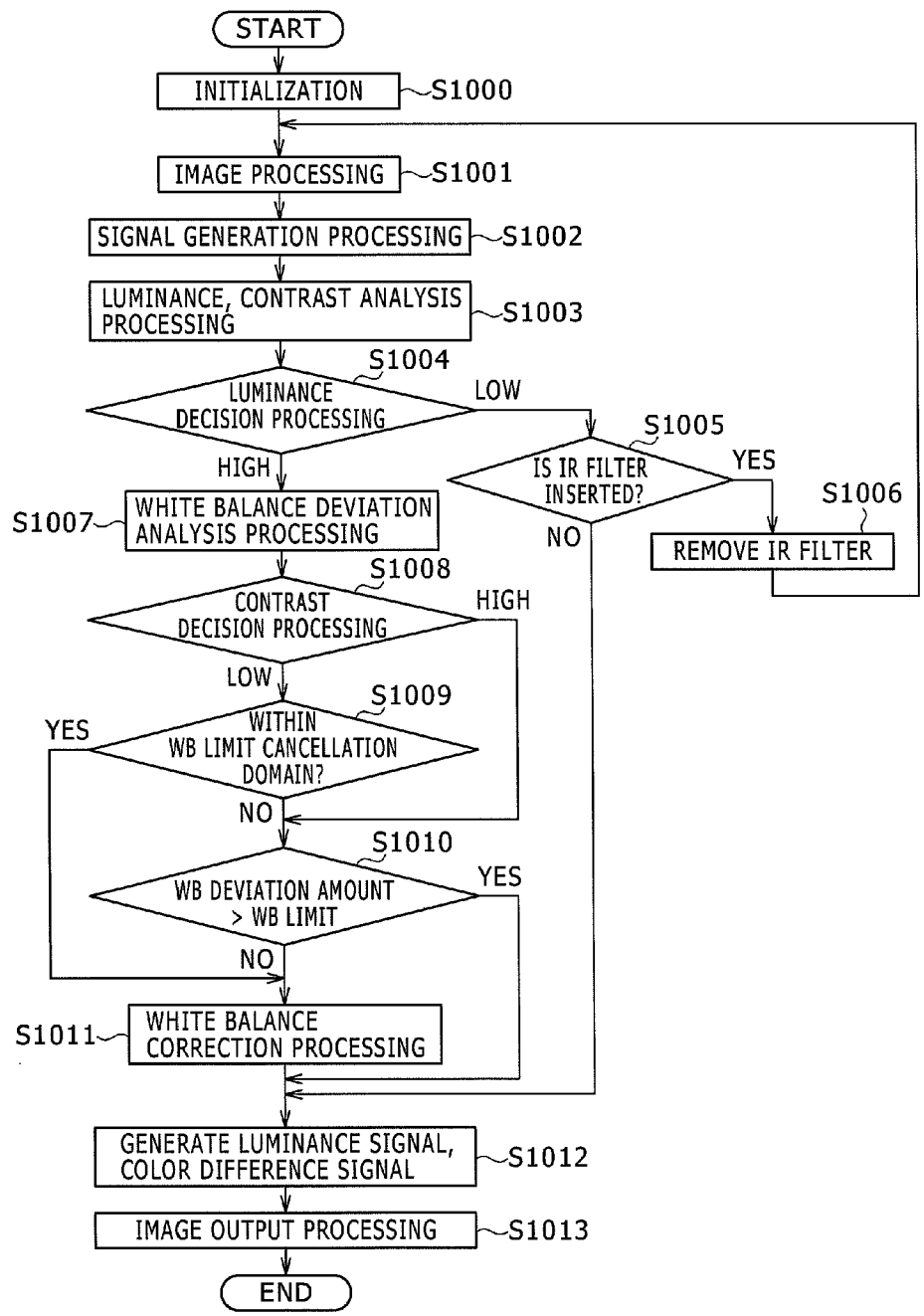
FIG. 10 is a flow chart showing one example of the processing flow of the imaging device.

FIG. 10 is a flow chart showing one example of the processing flow of the imaging device. At the start of processing, the control unit 106 initializes the setting in step S1000, and for example inserts the IR filter 201. In step S1001, the imaging unit 101 captures an image of the object for imaging and performs image processing to output the captured image as a signal. In step S1002, The signal processing unit 102 performs signal generation processing such as the luminance signal. In step S1003, the histogram unit 103 analyzes signals such as the luminance signal, and acquires luminance and contrast information.

In step S1004, the control unit 106 performs luminance decision processing to compare the luminance information acquired in step S1003 with the specified luminance information. The processing proceeds to step S1005 if the luminance information acquired in step S1003 is lower than the specified luminance information, and if decided in step S1005 that the control unit 106 has inserted the IR filter 201, the control unit 106 removes the IR filter 201 in step S1006 and the processing returns to step 1001. If decided that the IR filter 201 was not inserted in step S1005, the processing proceeds to step S1012.

In step S1004, the processing proceeds to step S1007 if decided that the luminance information is higher than the specified luminance. In step S1007, the white balance detector unit 104 performs white balance deviation analysis processing for detecting the white balance deviation amount and the color difference information. In step S1008, if the contrast is higher than the reference value from the contrast information acquired in step S1003, the processing proceeds to step S1010, if lower than the reference value, the processing proceeds to step S1009.

In step S1009, when the control unit 106 has decided from the white balance deviation analysis results acquired in step S1007 that the white balance is within the limit cancellation domain, the processing proceeds to step S1011, and when outside the limit cancellation domain the processing proceeds to step S1010.

In step S1010, the control unit 106 decides in step S1007 whether or not the amount of the white balance deviation acquired in step S1007 has exceeded the white balance correction upper limit. If the white balance correction upper limit has not been exceeded, the processing proceeds to step S1011, and if the white balance correction upper limit has not exceeded the processing proceeds to step S1012.

In step S1011, the white balance processor unit 105 performs the correction processing based on the white balance correction amount acquired in step S1007. In step S1012, the luminance signal generator unit 107 performs the luminance signal generation processing and the color difference signal generator unit 108 performs color difference signal generation processing, and in step S1013, the image output unit 109 performs image output processing, and outputs the image signal.

The imaging device of the present embodiment described above is capable of outputting higher visibility images by judging the imaging environment and selecting the imaging conditions or controlling the white balance even under conditions where there is a poor field of vision such as due to yellow dust.

For example, the case where reaching step S1012 when the judgment in step S1005 is NO, is a state where the luminance and contrast are both low or namely the imaging object is being image-captured in a dark state, so the imaging unit 101 captures images and improves the visibility without inserting the IR filter 201.

The case where reaching step S1011 when the decision in step S1009 was YES, is when the imaging object is being image-captured in a state where the luminance is high and the contrast is low and moreover the white balance is within the limit cancellation domain, and more specifically the yellow dust has caused poor visibility, the white balance processor unit 105 corrects the white balance for the yellow tint in the image due to the yellow dust in step S1011 to improve the (image) visibility.

The case where reaching step S1011 when the decision in step S1009 was NO, is when the imaging object is being image-captured in a state where the luminance is high, the contrast is low, and moreover the white balance is outside the limit cancellation domain. The control unit 106 decides whether or not to perform white balance correction processing in step S1011 based on the decision results in step S1010, including the case when judged in steps S1004 and S1008 that the luminance is high and the contrast is also high. The white balance processor unit 105 in this way corrects the white balance even in a state for example where fog is present. However, the white balance processor unit 105 does not correct the white balance during image capture for example of the imaging object drastically biased to a specified color extending across the entire screen or a tilted image object so that harmful effects due to the relevant correction can be avoided. In other words, the visibility in the captured image can be improved in either of the above cases.

The present embodiment can in the same way obtain an image with good visibility by setting the limit cancellation domain of the white balance as needed, if the cause can be identified as due to color, even in cases where yellow dust cannot be specified as the cause of bad visibility, and even if not yellow dust or even if a color other than a yellow color.

Second Embodiment

Figure 11:
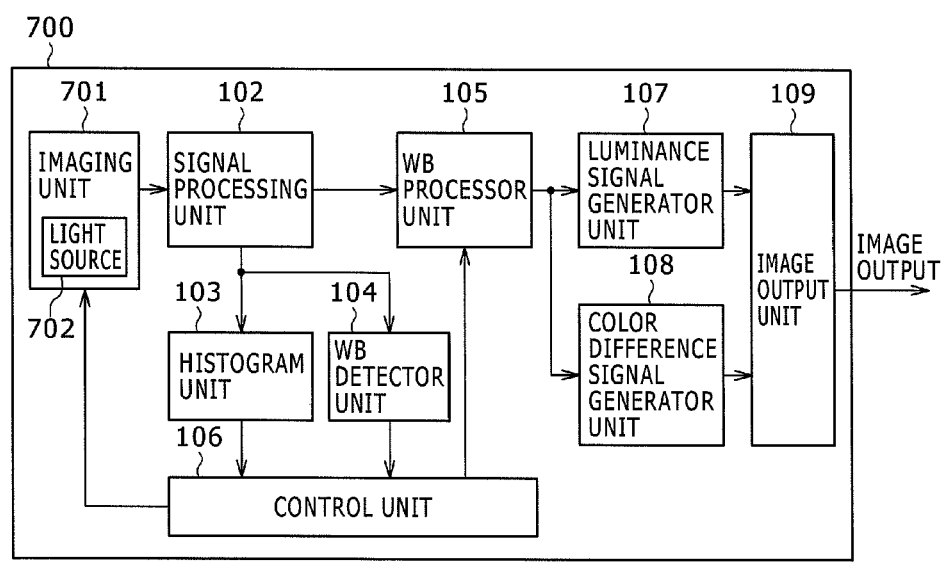
FIG. 11 is a block diagram showing the overall structure of the imaging device of one embodiment.

FIG. 11 is a block diagram showing the overall structure of the imaging device 700 of the second embodiment. Elements with the same structure as in FIG. 1 are assigned the same reference numerals and a description is omitted. The reference numeral 700 denotes the imaging device, 701 is the imaging unit, and 702 is the light source. The light source 702 is a light source for visible light or is an IR light source or may include both light sources according to the imaging condition or application.

When using the imaging device 700 for the purpose of surveillance, an IR light source whose light is not visible to the human eye is often used to illuminate the imaging object during low illumination such as at night. When the light source 702 is an IR light source, the ON and OFF control of the IR light source is linked to the control of the IR filter 201 in FIG. 2. As described in FIG. 4, the R pixels, G pixels, and B pixels in the image sensor unit 203 are sensitive to IR light so that illuminating the imaging object by irradiating IR light increases the light intensity on the imaging object and even though the image in nearly monochrome (black-and-white, the visibility of the output image can be improved.

In the processing flow in FIG. 10, the light source 702 turns off during the start of processing. The control unit 106 removes the IR filter 201 and turns on the light source 702 in step S1006. Either of the IR filter 201 and light source 702 may be controlled first ahead of the other.

If jointly using the light source for the imaging device 700 as an auxiliary light to allow viewing by the human eye, the light source becomes a visible light source such as vehicle headlights. The control unit 106 in this case, turns on the light source 702 without removing the IR filter 201 in step S1006 in FIG. 10. Here, the visible light source has color in most cases. In such cases, the color of the visible light can be set in the limit cancellation domain, the same as for yellow dust so that even if there is a large deviation in the white balance due to the visible light source, corrections can be made, and an image with good color reproduction of the imaging object can be output.

The ON and OFF control of the light source 702 is linked to control of the IR filter 201 when jointly using an IR light source along with the visible light source for the light source 702. The visible light source is utilized as an auxiliary light source to aid human vision. The IR light source is utilized as an auxiliary light source of the imaging device 700. Illuminating the object by irradiating IR light increases the light intensity on the imaging object to allow outputting an image having high visibility even though a nearly monochromatic image.

The imaging device of the present invention described above can therefore utilize the light source to improve the visibility of the output image.

Third Embodiment

Figure 12:
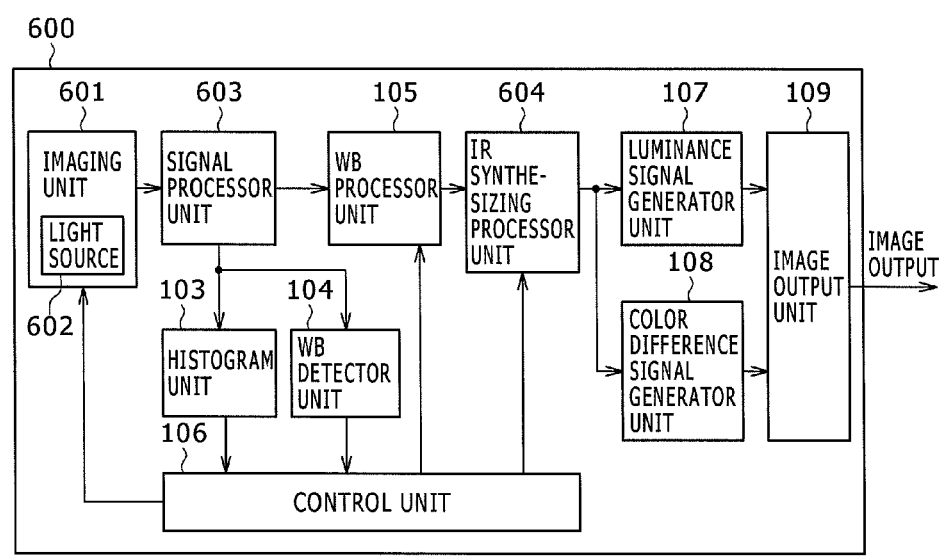
FIG. 12 is a block diagram showing the overall structure of the imaging device of one embodiment.

FIG. 12 is a block diagram showing the overall structure of the imaging device 600 of the third embodiment. Elements with the same structure as in FIG. 1 are assigned the same reference numerals and a description is omitted. The reference numeral 600 denotes the imaging device, 601 denotes the imaging unit, 602 denotes the light source, 603 denotes the signal processing unit, and 604 denotes the IR synthesizing processor unit. The light source 602 is a light source of visible light, or is an IR light source, or is a light source including both a visible light and IR light source according to the imaging conditions and application. In many cases imaging devices for the purpose of surveillance, utilize an IR light source whose light is not visible to the human eye is often used to illuminate the imaging object during low illumination such as at night. When using an IR light source as the light source 602, the pixel placement described in FIG. 3 may be used for the image sensor unit in the imaging unit 601, however the IR light source can be used more effectively by utilizing an image sensor unit in which IR pixels are placed. Also, control of the IR filter 201 may be eliminated to allow simplifying the imaging device structure. The imaging unit 601 utilizing an IR pixel placement may be described next.

Figure 13:
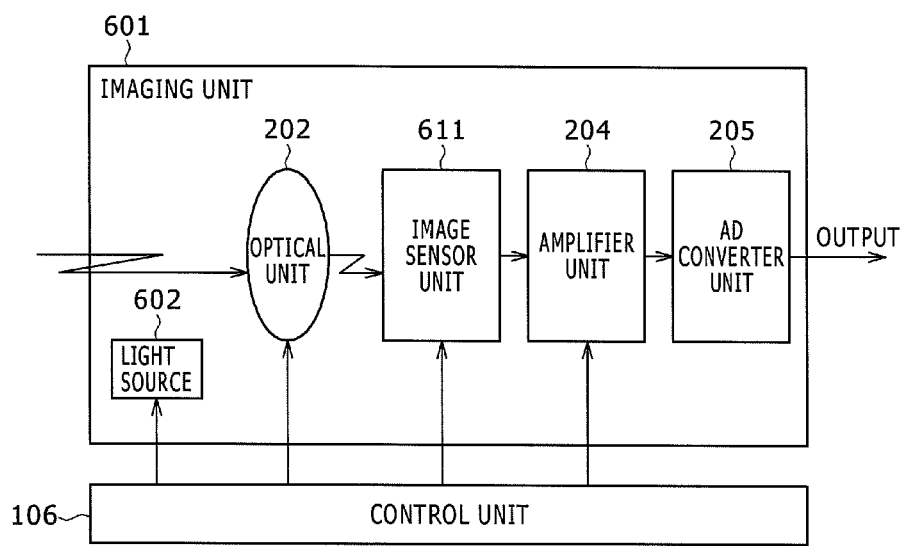
FIG. 13 is a block diagram showing one example of the imaging unit structure.

FIG. 13 is a block diagram showing one example of the imaging unit 601. The same reference numerals are assigned to the same structural elements in FIG. 12 and FIG. 2 and a description is omitted. The reference numeral 611 denotes the image sensor unit, and light on all wavelengths is irradiated onto the image sensor unit 611 by way of the optical unit 202 without installing an IR filter.

Figure 14:
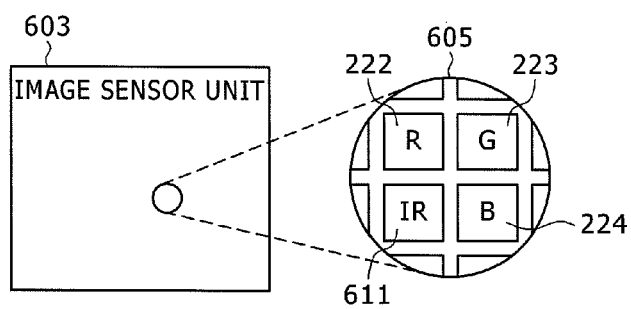
FIG. 14 is a drawing showing an example of the pixel placement in the image sensor unit.

FIG. 14 is a drawing showing an example of the pixel placement in the image sensor unit 603. The structural elements identical to FIG. 3 are assigned the same reference numerals and a description is omitted. The reference numeral 605 is an enlargement of a fragment of the image sensor unit 611. The image sensor unit 611 is IR pixels having sensitivity only in the IR region. In the image sensor unit 611, the R pixels 222 and G pixels 223, and the IR pixels 611 and B pixels 224 are placed alternately placed on each line. The color combination on each line is not limited to the combination in FIG. 14 and the colors may be interchanged.

Figures 15, 16:
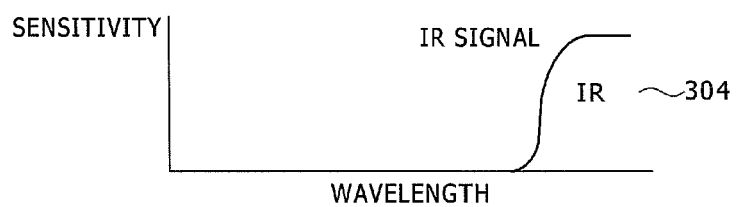
FIG. 15 is a graph showing the spectral characteristics of the IR pixel.
FIG. 16 is a table showing one example of the relation between the analysis results and the control conditions for histogram unit and the white balance detector unit.

FIG. 15 is a graph showing the sensitivity characteristics for the light wavelength of the IR pixels 611 shown in FIG. 14 or namely the spectral characteristics. In the spectral characteristics 304, the sensitivity is mostly only in the IR region and there is virtually no sensitivity in the visible light region. Therefore, the luminance level of just the visible light can be extracted in the signal processing unit 603 by processing to subtract the luminance level in the IR pixels 611 from the luminance levels of the R pixel 222, G pixel 223, and B pixel 224. The IR filter 201 previously described in FIG. 2 is therefore not needed in the FIG. 13 of the present embodiment. The IR sensitivity of the R pixel 222, G pixel 223, and B pixel 224 are different so are subtracted after being multiplied by a coefficient matching each sensitivity in the IR luminance data.

The output signal from the imaging unit 601 for example, alternately outputs in odd-numbered lines as the R pixel 222 luminance data and G pixel 223 luminance data, and alternately outputs in even-numbered lines as the IR pixel 611 luminance data and B pixel 224 luminance data according to the pixel array in the image sensor unit 611.

The signal processing unit 603 sequentially extracts the R pixel 222 luminance data, G pixel 223 luminance data, B pixel 224 luminance data, and IR pixel 611 luminance data from the output signal of the imaging unit 601. The signal processing unit 603 generates the IR pixel 611 luminance data by using the luminance data of the IR pixel 611. Moreover, the signal processing unit 603 performs demosaicing as needed after removing the IR component from the R pixel 222 luminance data, G pixel 223 luminance data, B pixel 224 luminance data, generates an R signal, G signal, and B signal and outputs them to the IR synthesizing processor unit 604. Also, in order to reflect the luminance level of the IR pixel in the output image, the signal processing unit 603 performs demosaicing as needed the same as for other signals, and outputs the IR signal to the IR synthesizing processor unit 604. The IR synthesizing processor unit 604 processes the signal supplied from the signal processing unit 603 according to instructions from the control unit 106 and for example outputs only the R signal, G signal, and B signal; or only the IR signal; or a signal synthesized from the IR signal relative to the R signal, G signal, and B signal, to the luminance signal generator unit 107 and the color difference signal generator unit 108. The luminance signal for the histogram unit 103 may be generated from the R signal, G signal and B signal, or may be generated from the average value of the R pixel 222 luminance data and G pixel 223 luminance data on each line.

FIG. 16 is a table showing one example of the relation between the control conditions and the analysis results for histogram unit 103 and the white balance detector unit 104 of the imaging device 600.

When the luminance and contrast of the image for capture are both high, the imaging device turns the IR light source off, and white balance processing is performed when the amount of white balance deviation is below the limit value.

When the luminance is high and the contrast is low, and the white balance is outside the limit cancellation domain, the IR light source is judged as effective in the bad visibility caused by fog and so on, the IR light source is turned on, and moreover the white balance is processed when the amount of deviation in the white balance is below the limit value. Turning the IR light source on can be expected to boost the contrast of the luminance.

When the luminance of the image for capture is high, the contrast is low, and the white balance is within the limit cancellation domain, the cause of the bad visibility is for example judged as due to yellow dust, and the IR light source is turned off since the IR light source is unlikely to improve visibility because the light from the light source is reflected by the yellow dust. The white balance is processed regardless of the amount of deviation in the white balance.

When the luminance of the image for capture is low, the IR light source is turned on. The luminance of the IR signal and the contrast are higher than the signal for the visible light so an IR signal is output instead of the visible light signal. The color can also possibly be reproduced by synthesizing the IR signal with the visible light signal.

Figure 17:
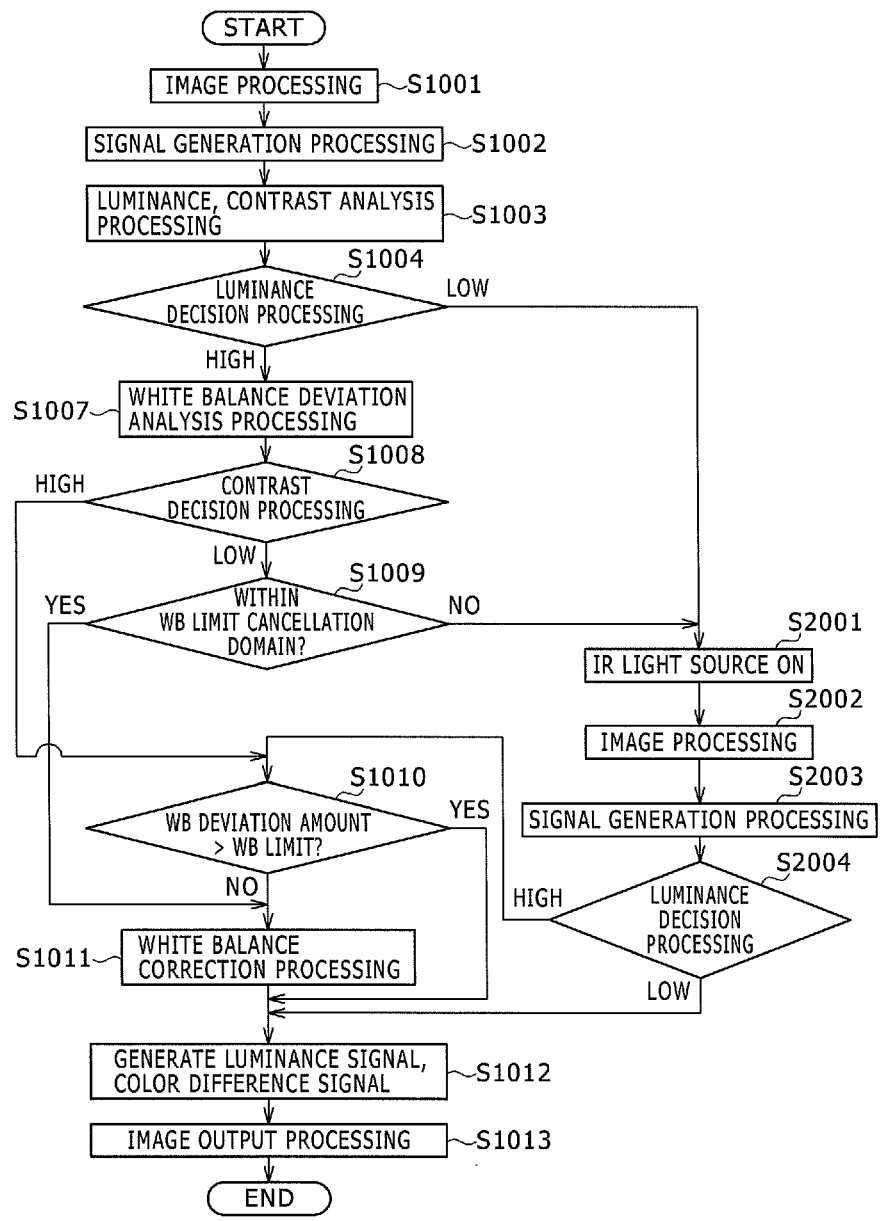
FIG. 17 is a flow chart showing one example of the processing flow in the imaging device.

FIG. 17 is a flow chart showing one example of the processing flow in the imaging device 600. The same step numbers are assigned to the same steps as in FIG. 9 and a description is omitted.

After luminance decision processing by the control unit 106 in step S1004, and the luminance of the captured image acquired in step S1003 is lower than the specified luminance, the processing proceeds to step S2001, and the control unit 106 sets the IR light source in the light source 602 to ON. The imaging unit 601 performs imaging processing in step S2002 to capture the imaging object irradiated by the IR light source and in the signal generation processing in step S2003 the signal processing unit 603 generates an IR signal. In the luminance decision processing in the next step S2004, when decided that the luminance is low the same as judged in the prior step S1004, the processing proceeds to step S1012 without performing the white balance correction processing via the steps S1010 and S1011. Here, the IR synthesizing processor unit 604 inputs all IR signals instead of inputting the R signal, G signal, and B signal as the input signal to the luminance signal generator unit 107 and the color difference signal generator unit 108 according to the instruction from the control unit 106. The imaging device 600 in this way outputs an image of the IR signal.

When the luminance of the captured image acquired in step S1003 was higher than the specified luminance after the luminance decision processing by the control unit 106 in step S1004, the processing proceeds to step S1007. Also, when the contrast is low in step S1008, and the control unit 106 decided that the white balance was outside the limit cancellation domain, the control unit 106 sets the IR light source in the light source 602 to ON in step S2001. In step S2002, the imaging unit 601 performs the same imaging processing as in step S1001 for the imaging object illuminated by the IR light source, and in step S2003 the signal processing unit 603 performs the same signal generation processing as in step S1002. Namely, the signal processing unit 603 generates the R signal, G signal, and B signal, and if necessary an IR signal, and supplies these signals to the IR synthesizing processor unit 604. In this case, the control unit 106 sets the IR light source to ON in step S2001 and/or performs the luminance decision processing again in step S2004 since the luminance may possibly have changed per the decision in the prior step S1004 from the synthesizing of the signal in step S2003.

If the result from the decision in step S2004 is that the luminance is higher than a specified value, the processing proceeds to step S1010, and the white balance correction processing is performed in step S1011 based on those results. If the result from the decision in step S2004 is that the luminance is lower than a specified value, the processing proceeds to step S1012 without correcting the white balance in step S1010 and S1011.

The resolution in the image sensor unit 611 is low compared to that from the pixel placement in the image sensor unit 203 in FIG. 3; however, the advantage is provided that visible light images and IR images can be acquired at the same time.

The imaging device of the present embodiment as described above is capable of effective use of an IR light source. Therefore, even under a state where the visibility is poor such as due to yellow dust, a white balance corrected image with satisfactory color reproducibility can be output.

Fourth Embodiment

Figure 18:
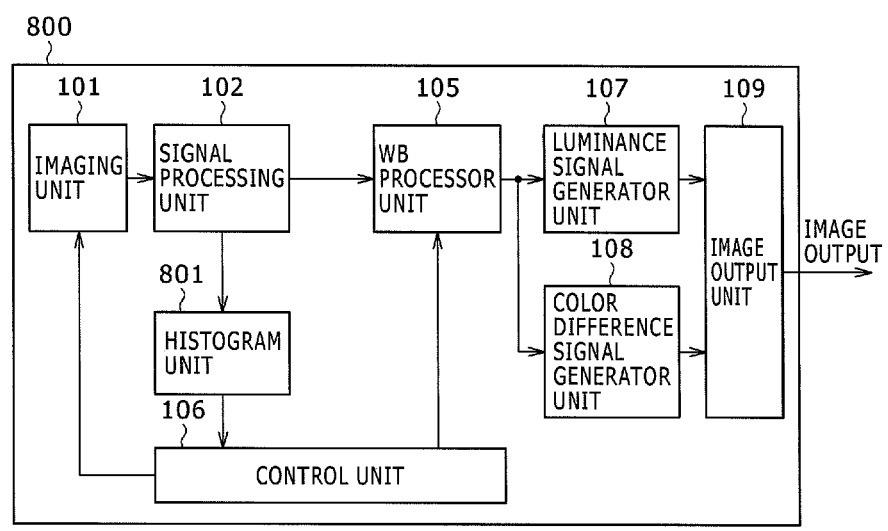
FIG. 18 is a block diagram showing the overall structure of the imaging device of one embodiment.

FIG. 18 is a block diagram showing the overall structure of the imaging device 800 of the fourth embodiment. Structural elements that are the same as in FIG. 1 are assigned the same reference numeral and a description is omitted. The reference numeral 800 denotes the imaging device, 801 denotes the histogram unit for detecting the luminance, contrast, and white balance. The histogram unit 801 is described next.

The histogram unit 801 is input by a color signal including luminance, and for example the R signal, G signal, and B signal in FIG. 6, and generates their respective histograms.

Figure 19A:
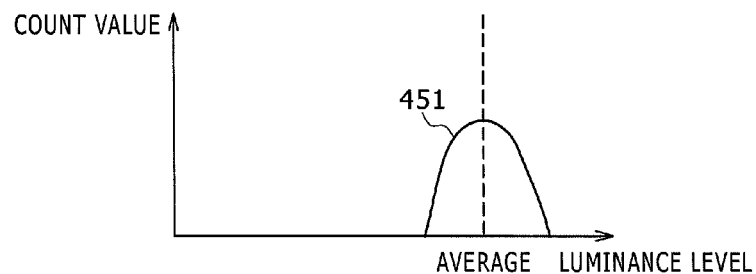
FIG. 19A is a graph showing an example of the luminance distribution detected in the histogram unit.
Figure 19B:
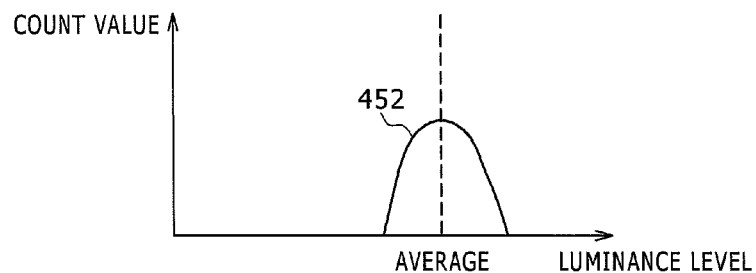
FIG. 19B is a graph showing an example of the luminance distribution detected in the histogram unit.
Figure 19C:
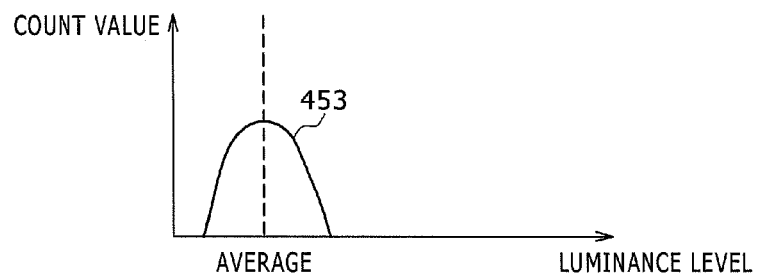
FIG. 19C is a graph showing an example of the luminance distribution detected in the histogram unit.

FIGS. 19A, 19B, and 19C are graphs showing examples of the luminance distribution detected by the histogram unit. Here, FIG. 19A is the luminance distribution 451 of the R signal, FIG. 19B is the luminance distribution 452 of the G signal, and FIG. 19C is the luminance distribution 453 of the B signal. FIG. 19A through 19C show one example of an environment where yellow dust is falling, the luminance of the R signal and G signal are high, and the luminance of the B signal is low. Here, the luminance is evaluated for example by setting an average value for the luminance distribution of each color, as the luminance for the R signal (luminance), G signal (luminance), and B signal (luminance); and using the luminance found from using a conversion formula on each color luminance, as the overall luminance. Also, the deviation in the white balance is calculated by comparing the R signal luminance, the G signal luminance, and B signal luminance that were found. The decision on the contrast may also utilize the dispersion of the G signal as a representative value, and may also utilize an average value for the dispersion in the G signal and dispersion in the R signal, or an average value of the dispersion value for the luminance distribution of each color.

The histogram unit 801 described above is capable of detecting the luminance, contrast, and white balance at one time. A wrong decision might possibly be made regarding the contrast during bad visibility, when evaluating the contrast of just the luminance signal, if there is a large difference in the luminance of each color signal whose white balance has deviated. However, the histogram unit 801 is capable of reliably evaluating the contrast by evaluating the separate signals of each color.

Fifth Embodiment

Figure 20:
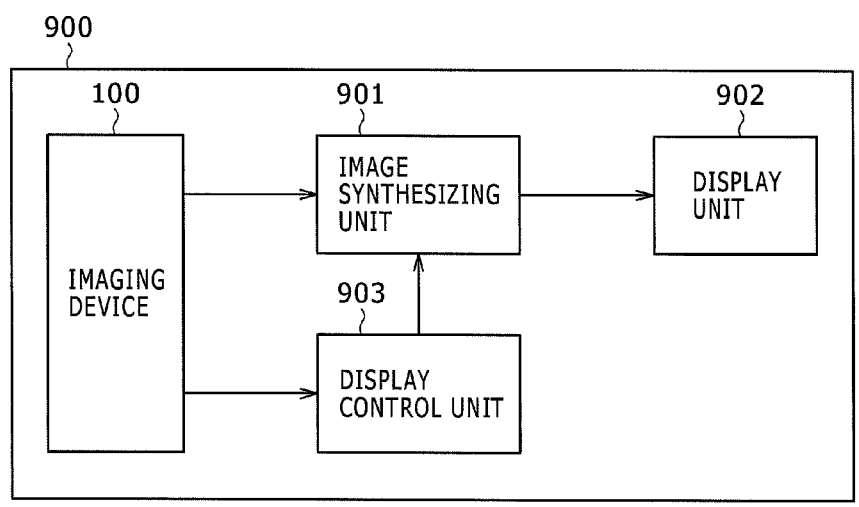
FIG. 20 is a block diagram showing the overall structure of the imaging device of one embodiment.

FIG. 20 is a block diagram showing the overall structure of the imaging system 900 of the fifth embodiment. Structural elements that are the same as in FIG. 1 are assigned the same reference numeral and a description is omitted. The reference numeral 900 denotes the imaging system, the reference numeral 901 denotes the image synthesizing unit, the reference numeral 902 denotes the display unit, and reference numeral 903 denotes the display control unit.

The imaging device 100 outputs an image signal to the image synthesizing unit 901, and outputs an image status such as the imaging environment or imaging conditions to the display control unit 903. The display control unit 903 generates a message screen for display based on the imaging status and outputs the message screen to the image synthesizing unit 901. The image synthesizing unit 901 generates a synthesized signal combining the image signal from the imaging device 700 with the message screen of the display control unit 903 and outputs the synthesized signal to the display unit 902. The display unit 902 displays the synthesized signal that was input. The display unit 902 may include for example a flat display such as a liquid crystal display or a LED display, and a projector just capable of displaying an image.

Figure 21:
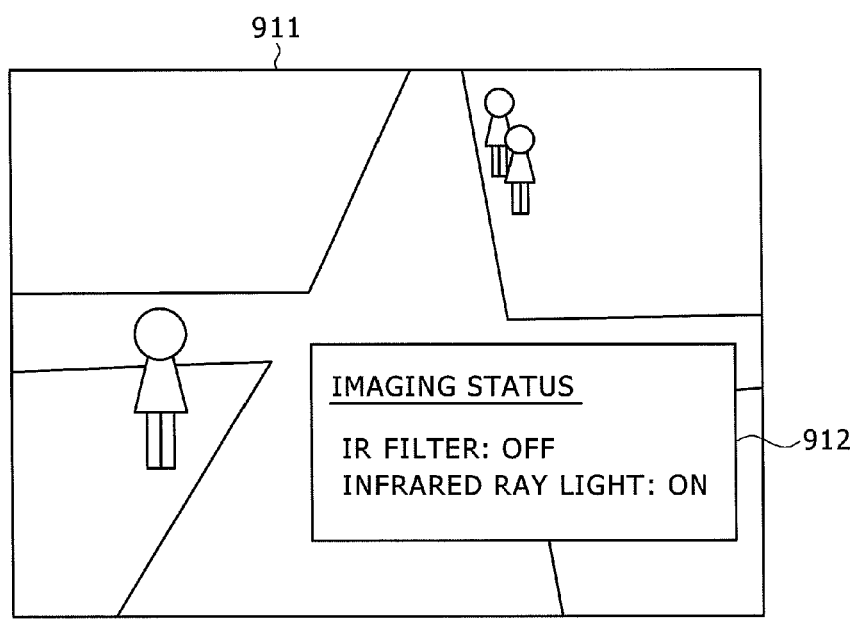
FIG. 21 is a drawing showing one example of the display screen of the display unit.

FIG. 21 is a drawing showing one example of the display screen of the display unit 902. The reference numeral 911 denotes the display screen of the display unit, and reference numeral 912 denotes the message display unit. In FIG. 21, the message display unit 912 for example displays the imaging status that the imaging environment at night time, and that the IR filter is OFF and the IR light source is ON. By displaying an imaging status message on the display unit 902, the person viewing the display screen can know the status of the imaging device.

Figure 22:
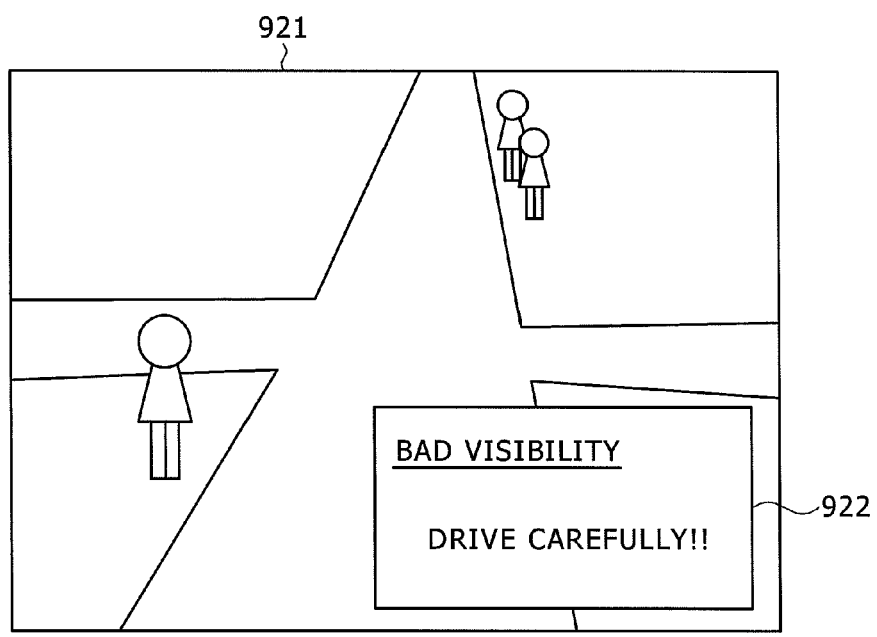
FIG. 22 is a drawing showing one example of the display screen of the display unit.

FIG. 22 is a drawing showing one example of the display screen of the display unit 902. The reference numeral 921 denotes the display screen of the display unit, and reference numeral 922 denotes the message display unit. In FIG. 22, the message display unit 922 displays imaging environment and a warning message corresponding to the imaging environment. Along with allowing the person viewing the display screen to know the status of the imaging device, during on-board vehicle use, the display screen can ensure safety by displaying advice or other items to augment safety.

The description utilized the imaging device 100 in FIG. 1 as the imaging device however the imaging devices in other embodiments of the present invention such as the imaging device 600 in FIG. 12 and the imaging device 800 in FIG. 18 may also be utilized.

What is claimed is:

1. An imaging device that outputs signals relating to an image-captured imaging object, comprising:
    an imaging unit that generates electrical signals relating to the imaging object whose image is captured;
    a signal processing unit that processes electrical signals generated in the imaging unit, and generates video signals including luminance information and color information;
    a histogram unit that generates histograms based on luminance information contained in the video signal generated by the signal processing unit;
    a white balance detector unit that detects deviation in the white balance of the video signal based on color information contained in the video signal generated by the signal processing unit;
    a white balance processor unit supplied with a video signal generated by the signal processing unit, and that corrects the white balance of the video signal based on the deviation in white balance detected by the white balance detector unit;
    an image output unit that outputs the video signal whose white balance is corrected by the white balance processor unit; and
    a control unit that controls the operation of the structural elements of the imaging device,
    wherein the control unit controls the imaging unit and the white balance processor unit based on the histogram generated by the histogram unit and the deviation in the white balance detected by the white balance detector unit.

2. The imaging device according to claim 1,
    wherein the control unit:
    decides if the luminance of the video signal generated by the signal processing unit is higher than a specified luminance value or not based on the histogram generated by the histogram unit,
    decides if the contrast of the luminance of the video signal generated by the signal processing unit is higher than a specified contrast value or not based on the histogram generated by the histogram unit,
    decides if the color information of the video signal generated by the signal processing unit is within a specified white balance cancellation domain or not based on the deviation in the white balance detected by the white balance detector unit; and
    when the luminance of the video signal is higher than the specified luminance value and the contrast of the luminance of the video signal is lower than the specified contrast value;
    controls the white balance processor unit to stop correction of the white balance when the color information of the video signal is outside the specified white balance cancellation domain, and the amount of deviation in the white balance of the video signal detected by the white balance detector unit is larger than a specified value, and
    controls the white balance processor unit to correct the white balance regardless of the amount of deviation in the white balance of the video signal, when the color information of the video signal is within the specified white balance cancellation domain.

3. The imaging device according to claim 1,
    wherein the imaging device includes an infrared filter, and the control unit controls whether or not to mount the infrared filter in the imaging device.

4. The imaging device according to claim 3,
wherein the imaging unit contains a light source that illuminates the imaging object, and the control unit controls whether or not to use the light source.

5. The imaging device according to claim 4,
wherein the light source illuminates the imaging object with infrared light, and the control unit executes control to remove the infrared filter from the imaging unit when the light source is lit.

6. The imaging device according to claim 5,
wherein the light source illuminates the imaging object with infrared light including visible light.

7. An imaging system comprising:
an imaging device that outputs signals relating to an image-captured imaging object and that displays images relating to the signal,
wherein the imaging device includes:
an imaging unit that generates electrical signals relating to the imaging object whose image is captured;
a signal processing unit that processes electrical signals generated in the imaging unit, and generates a video signal including luminance information and color information;
a histogram unit that generates histograms based on luminance information contained in the video signal generated by the signal processing unit;
a white balance detector unit that detects deviation in the white balance of the video signal based on color information contained in the video signal generated by the signal processing unit;
a white balance processor unit to which the video signal generated by the signal processing unit is supplied and that corrects the white balance of the video signal based on the deviation in white balance detected by the white balance detector unit;
an image output unit that outputs the video signal whose white balance is corrected by the white balance processor unit; and
a control unit that controls the operation of the structural elements of the imaging device, and that controls the imaging unit and the white balance processor unit based on the histogram generated by the histogram unit and the deviation in the white balance detected by the white balance detector unit, and
the imaging system further comprising:
a display control unit that generates image signals relating to information for the imaging unit and the white balance processor unit controlled by the control unit of the imaging device;
an image synthesizing unit that generates synthesized images combined from the image signal generated by the display control unit and the video signal output by the image output unit of the imaging device; and
a display unit that displays a synthesized image that is synthesized by the image synthesizing unit.

8. The imaging system according to claim 7,
wherein the control unit of the imaging device:
decides if the luminance of the video signal generated by the signal processing unit is higher than a specified luminance value or not based on the histogram generated by the histogram unit,
decides if the contrast of the luminance of the video signal generated by the signal processing unit is higher than a specified contrast value or not based on the histogram generated by the histogram unit,
decides if the color information of the video signal generated by the signal processing unit is within a specified white balance cancellation domain or not based on the deviation in the white balance detected by the white balance detector unit; and
when the luminance of the video signal is higher than the specified luminance value, and the contrast of the luminance of the video signal is lower than the specified contrast value;
controls the white balance processor unit so that the correction of the white balance is stopped when the color information of the video signal is outside the specified white balance cancellation domain, and the amount of deviation in the white balance of the video signal detected by the white balance detector unit is larger than a specified deviation value, and
controls the white balance processor unit to correct the white balance regardless of the amount of deviation in the white balance of the video signal, when the color information of the video signal is within the specified white balance cancellation domain.

9. An imaging method for an imaging device that corrects and outputs the white balance of signals relating to an image-captured imaging object, the imaging method comprising:
deciding if the luminance of a video signal is higher than a specified luminance value or not based on a histogram of luminance information contained in the video signal obtained by image capture,
deciding if the contrast of the luminance of the video signal is higher than a specified contrast value or not based on the histogram, and
deciding if color information of the video signal is within a specified white balance cancellation domain or not based on a deviation in the white balance in the color information contained in the video signal obtained by image capture; and
when the luminance of the video signal is higher than the specified luminance value, and the contrast of the luminance of the video signal is lower than the specified contrast value,
stopping the correction of the white balance when the color information of the video signal is outside the specified white balance cancellation domain, and the amount of deviation in the white balance of the video signal is larger than a specified deviation value, and
performing the correction of the white balance regardless of the amount of deviation in the white balance of the video signal when the color information of the video signal is within the specified white balance cancellation domain.

* * * * *